United States Patent
Mai et al.

(10) Patent No.: US 9,873,805 B2
(45) Date of Patent: Jan. 23, 2018

(54) SOLVENT-BASED FLEXIBLE PACKAGING INK COMPOSITION FOR HIGH TEMPERATURE AND PRESSURE

(71) Applicant: Flint Group North America Corporation, Plymouth, MI (US)

(72) Inventors: Rurou Mai, Mason, OH (US); Philip David Ernest, Mason, OH (US); Grant T. Shouldice, Mason, OH (US); Paolo Talamelli, Parabiago (IT)

(73) Assignee: Flint Group North America Corporation, Plymouth, MI (US)

( * ) Notice: Subject to any disclaimer, the term of this patent is extended or adjusted under 35 U.S.C. 154(b) by 77 days.

(21) Appl. No.: 15/176,990

(22) Filed: Jun. 8, 2016

(65) Prior Publication Data

US 2016/0362569 A1 Dec. 15, 2016

Related U.S. Application Data

(60) Provisional application No. 62/173,531, filed on Jun. 10, 2015.

(51) Int. Cl.
| | | |
|---|---|---|
| *C09D 11/102* | (2014.01) | |
| *C09D 11/106* | (2014.01) | |
| *C09D 11/033* | (2014.01) | |
| *C09D 11/037* | (2014.01) | |

(52) U.S. Cl.
CPC .......... *C09D 11/102* (2013.01); *C09D 11/033* (2013.01); *C09D 11/037* (2013.01); *C09D 11/106* (2013.01)

(58) Field of Classification Search
CPC .... C09D 11/033; C09D 11/037; C09D 11/102
See application file for complete search history.

(56) References Cited

U.S. PATENT DOCUMENTS

| | | | |
|---|---|---|---|
| 6,723,820 B1 * | 4/2004 | Arcurio | C08G 18/12 156/277 |
| 2009/0202839 A1 | 8/2009 | Uno et al. | |
| 2010/0279041 A1 | 11/2010 | Mathew et al. | |
| 2011/0027543 A1 | 2/2011 | Metla | |

FOREIGN PATENT DOCUMENTS

| | | |
|---|---|---|
| JP | H05302050 A | 11/1993 |
| JP | H05302050 A | 11/1993 |
| JP | 2004175867 A | 6/2004 |
| JP | 2004175867 A | 6/2004 |

* cited by examiner

*Primary Examiner* — Arrie L Reuther
(74) *Attorney, Agent, or Firm* — Honigman Miller Schwartz and Cohn LLP

(57) ABSTRACT

A solvent-soluble flexographic retort ink particularly suitable for use in laminating packaging applications. The inks maintain lamination bond strength after being subjected to retort conditions.

14 Claims, No Drawings

SOLVENT-BASED FLEXIBLE PACKAGING INK COMPOSITION FOR HIGH TEMPERATURE AND PRESSURE

CROSS REFERENCE TO RELATED APPLICATIONS

This application claims the benefit of U.S. Provisional Patent Application No. 62/173,531, filed Jun. 10, 2015, the disclosures of which are hereby incorporated by reference in their entirety.

FIELD OF THE INVENTION

The present invention relates to a solvent-based flexographic ink for retort applications and methods for flexographic printing on flexible packaging material such as plastic films, laminates or foils.

BACKGROUND

This section provides information helpful in understanding the invention but that is not necessarily prior art.

Flexible packaging includes a wide variety of materials such as various plastic films, laminates, and foil that extend the shelf life and protect many products, such as food products. In order to extend the shelf of a food product the food product is packaged and subjected to pasteurization or sterilization using high temperatures, high pressure, or both (retort process) to destroy bacteria.

Retort ink systems have been known for some time in gravure printing. However, due to the necessary pigment load and solvency of the resin required so as not to swell flexographic plates, development of retort inks for flexographic printing has been limited. Despite prior efforts, there remains a need for an improved flexographic ink for printing on flexible packaging material that provides high lamination bond strength when subjected to high temperature or pressure processing, such as in a retort process.

SUMMARY OF THE DISCLOSURE

This need is met by the solvent-based flexographic inks of the present invention which have unexpectedly high lamination bond strength. The inks of the present invention also enable high definition print graphics, increased press speeds, and improved graphic densities in flexographic printing.

This section provides a general summary rather than a comprehensive disclosure of the full scope of the invention and of all its features.

One embodiment of the invention is a solvent-based, flexographic ink, comprising a solvent-soluble poly(urethane/urea) resin produced by reacting an isocyanate-functional polyurethane prepolymer with a diamine, in which the polyurethane prepolymer is the reaction product of: a diisocyanate component and a diol component comprising a short chain diol having a molecular weight up to about 400 and a polyether diol having a molecular weight from about 500 to about 3,000; polyvinyl butyral; a pigment; and an organic solvent; in which the amine value of the poly (urethane/urea) resin is from about 3 to about 7 and the weight ratio of poly(urethane/urea) resin to polyvinyl butyral (PVB) from about 4.0 to about 6.5.

It has surprisingly been found that the inks now disclosed, comprising poly(urethane/urea) resin having an amine value from about 3 to about 7 and PVB in which the weight ratio of the poly(urethane/urea) resin to PVB is from about 4.0 and about 6.5 have better properties, including better printability, higher color density, and higher lamination bond strength before and after retort than inks having higher or lower weight ratios of the poly(urethane/urea) resin and PVB in which the amine value of the poly(urethane/urea) resin is zero.

The presently disclosed solvent-based flexographic inks are particularly suitable for use in laminating packaging that is subjected to retort conditions (e.g. pasteurization or sterilization). The laminates printed with the inks of the present invention maintain a printed image and structural integrity after being subjected to the high pressure and temperatures associated with retort conditions.

One embodiment of the present invention is a solvent-based, flexographic ink, comprising: (A) a solvent-soluble poly(urethane/urea) resin produced by reacting an isocyanate-functional polyurethane prepolymer with a diamine, wherein the polyurethane prepolymer is the reaction product of: (a) a diisocyanate component; and (b) a diol component comprising a short chain diol and a polyether diol, wherein the short chain diol has a molecular weight up to about 400 and the polyether diol has a number average molecular weight from about 500 to about 3,000; (B) polyvinyl butyral; (C) a pigment; and (D) an organic solvent.

Another embodiment of the present invention is a solvent-soluble flexographic ink, comprising: (A) a solvent-soluble poly(urethane/urea) resin produced by reacting an isocyanate-functional polyurethane prepolymer with a diamine, wherein the polyurethane prepolymer is the reaction product of: (a) a diisocyanate component; and (b) a diol component comprising a short chain diol and a polyether diol, wherein the short chain diol has a molecular weight up to about 400 and the polyether diol has a number average molecular weight from about 500 to about 3,000; (B) polyvinyl butyral; (C) a pigment; and (D) an organic solvent, wherein the weight ratio of poly(urethane/urea) resin to polyvinyl butyral is from about 4.0 to about 6.5 and the molar ratio of the diisocyanate groups from the diisocyanate component (a) to the OH equivalents from the diol component (b) is from about 1.2 to about 1.8.

Another embodiment of the present invention is a solvent-soluble flexographic ink comprising: (A) a solvent-soluble poly(urethane/urea) resin produced by reacting an isocyanate-functional polyurethane prepolymer with a diamine, wherein the polyurethane prepolymer is the reaction product of: (a) a diisocyanate component; and (b) a diol component comprising a short chain diol and a polyether diol, wherein the short chain diol has a molecular weight up to about 400 and the polyether diol has a number average molecular weight from about 500 to about 3,000; (B) polyvinyl butyral; (C) a pigment; and (D) an organic solvent, wherein the weight ratio of poly(urethane/urea) resin to PVB is from about 4.0 to about 6.5, the molar ratio of the diisocyanate groups from the diisocyanate component (a) to the OH equivalents from the diol component (b) is from about 1.2 to about 1.8, the reaction product of (a) and (b) has from about 1.3 to about 5.0 wt % of unreacted isocyanate groups, and the molar ratio of short chain diol to polyether diol is from about 0.67 to about 1.5.

In still another embodiment of the present invention is a solvent-soluble flexographic ink comprising: (A) a solvent-soluble poly(urethane/urea) resin produced by reacting an isocyanate-functional polyurethane prepolymer with a diamine, wherein the polyurethane prepolymer is the reaction product of: (a) a diisocyanate component; and (b) a diol component comprising a short chain diol and a polyether diol, wherein the short chain diol has a molecular weight up to about 200 and the polyether diol has a number average molecular weight from about 500 to about 3,000; (B) polyvinyl butyral; (C) a pigment; and (D) an organic solvent, wherein the weight ratio of poly(urethane/urea) resin to PVB is from about 4.0 to about 6.5, the molar ratio of the diisocyanate groups from the diisocyanate component (a) to the OH equivalents from the diol component (b) is from about 1.2 to about 1.8, the reaction product of (a) and (b) has from about 1.3 to about 5.0 wt % of unreacted isocyanate groups, the molar ratio of short chain diol to polyether diol is from about 0.67 to about 1.5, and the short chain diol has a melting point at least 25° C.

DETAILED DISCLOSURE

Definitions

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range.

The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. As used in this specification, the term "or" includes any and all combinations of one or more of the associated listed items.

Ratios may be expressed herein using a colon or a number based on the fraction of the first number divided by the second. For example the ratio of 2:1 can also be expressed as 2, likewise a ratio of 3:2 may be expressed as 1.5 and a ratio of 2:3 may be expressed as 0.67.

"Solvent-based" indicates that the flexographic inks are in an organic solvent medium (rather than an aqueous medium).

"Organic solvents" are organic compounds that are liquid at 20° C.

"fpm" is an abbreviation for feet per minute.

"bcm" is an abbreviation for billion cubic microns per square inch.

"lpi" is an abbreviation for lines per inch.

"PVB" is an abbreviation for polyvinyl butyral.

"PNP" is an abbreviation for propylene glycol n-propyl ether.

"Destruct bond" is a bond of two materials where if one attempts to pull the two apart a destruction of one of the materials will occur. The bonding agent is stronger than the materials bonded together.

A detailed description of exemplary, non-limiting embodiments follows.

A solvent-based flexographic ink according to the present invention comprises a poly(urethane/urea) resin, polyvinyl butyral, a pigment, an organic solvent, and optionally an ink additive or additives.

The polyurethane prepolymer is produced by reacting a diol component with a diisocyanate component. The diol component comprises a short chain diol and a polyether diol. The poly(urethane/urea) resin is prepared by reacting the prepolymer with a diamine. As used herein, short chain diols are diols having a molecular weight of up to about 400. As used herein, "polyether diols" are diols that have a number average molecular weight from about 500 to about 3000.

In various embodiments, the prepolymer used in the inks of the present invention is prepared by reacting a diol component with a diisocyanate component wherein the molar ratio of the isocyanate groups from the diisocyanate component to the OH groups from the diol component is from about 1.2 to about 1.8. In one embodiment the molar ratio of the isocyanate groups from the diisocyanate component to the OH groups from the diol component is from about 1.3 to about 1.8. In another embodiment the molar ratio of the isocyanate groups from the diisocyanate component to the OH groups from the diol component is from about 1.4 to about 1.8 In yet another embodiment the molar ratio of the isocyanate groups from the diisocyanate component to the OH groups from the diol component is from about 1.5 to about 1.8. In another embodiment the molar ratio of the isocyanate groups from the diisocyanate component to the OH groups from the diol component is from about 1.6 to about 1.8.

In various embodiments, the prepolymer used in the inks of the present invention is prepared by reacting a diol component with a diisocyanate component wherein the reaction product of the diisocyanate component and the diol component has from about 1.3 to about 5.0 wt % of unreacted isocyanate groups. In one embodiment, the prepolymer used in the inks of the present invention is prepared by reacting a diol component with a diisocyanate component wherein the reaction product of the diisocyanate component and the diol component has from about 1.3 to about 2.5 wt % of unreacted isocyanate groups. In another embodiment, the prepolymer used in the inks of the present invention is prepared by reacting a diol component with a diisocyanate component wherein the reaction product of the diisocyanate component and the diol component has from about 1.3 to about 2.0 wt % of unreacted isocyanate groups.

To obtain the high performance qualities of the inks of the present invention, the diol component comprises one or more short chain diols having a molecular weight of up to about 400 and having a melting point of at least about 25° C. The use of the short chain diols in the prepolymer provides a tack free polyurethane. In various embodiments the short chain diol has a molecular weight from about 75 to about 400 and melting point from about 25° C. to about 200° C. In one embodiment the short chain diol has a molecular weight of from about 75 to about 120 and a melting point of at least 25° C. In another embodiment the short chain diol has a molecular weight of from about 120 to about 160 and a melting point of at least 35° C. In yet another embodiment the short chain diol has a molecular weight of from about 160 to about 400 and a melting point of at least 50° C.

In various embodiments, the short chain diol component includes one or more short chain diols selected from the group consisting of 1,6-hexanediol, neopentyl glycol, 1,8 octanediol, 1,9 nonanediol, 1,10 decanediol, and 1,12 octadecanediol. In one embodiment, the short chain diol is 1,6-hexanediol. In another embodiment the short chain diol is 1,8-octanediol. In another embodiment the short chain diol is 1,9-nonanediol. And in yet another embodiment the short chain diol is neopentyl glycol.

Polyether diols useful for making prepolymer solutions include, but are not limited to, polypropylene glycol, In various embodiments of the invention the polyether diol has a number average molecular weight from about 500 to about 3,000, or from about 1,250 to about 2,750, or from about 1,500 to about 2,500, or from about 1,750 to about 2,250, or from about 1,800 to about 2,200. In particular embodiments of present invention the polyether diol is polypropylene glycol. In various embodiments of the invention the polypropylene glycol has a number average molecular weight from about 500 to about 3,000, or from about 1,250 to about 2,750, or from about 1,500 to about 2,500, or from about 1,750 to about 2,250, or from about 1,800 to about 2,200. In other embodiments the number average molecular weight of the polypropylene glycol is about 500, or about 1000, or about 2000, or about 3000. In various embodiment, the polymeric diols used to make the prepolymer, do not comprise polycaprolactone.

The polyether diol and the short chain diol make up the diol component of the prepolymer. The molar ratio of polyether diol to short chain diol in the diol component of the prepolymer is from about 0.67 to about 1.5, or from about 0.71 to about 1.4, or from about 0.77 to about 1.3, or from about 0.83 to about 1.2, or from about 0.83 to about 1.4, or from about 0.83 to about 1.3, or from about 0.83 to about 1.2, or from about 0.83 to about 1.1, or from about 0.9 to about 1.1, or about 1.

Diisocyanates suitable for use in making the poly(urethane/urea) resins of the present invention include, but not limited to, isophorone diisocyanate (IPDI), methylene bis-4-cyclohexyl isocyanate (H12MDI), cyclohexyl diisocyanate (CHDI), 1,3-bis(1-isocyanato-1-methylethyl)benzene, 1,6-hexamethylene diisocyanate (HDI), and 4,4'-diphenylmethane diisocyanate (MDI), toluene diisocyanate (TDI) isomers. In one embodiment, the diisocyanate is selected from the group consisting of aliphatic diisocyanates and aromatic diisocyanates. In another embodiment of the present invention the diisocyanate component is selected from the group consisting of IPDI, MDI, TDI, 1,3-bis(1-isocyanato-1-methylethyl)benzene and any combination thereof. In another embodiment, the diisocyanate component is selected from the group consisting of TDI and IPDI. In another embodiment, the diisocyanate component is, or consists essentially of, IPDI.

The polyurethane prepolymer is chain extended by reacting it with a difunctional amine. The polyurethane prepolymer may be added to the diamine in an organic solvent in the absence of monoamine chain terminators, at a controlled rate. In one embodiment the rate of addition of the diamine is from about 11 to about 20 wt % per minute of polyurethane prepolymer. In another embodiment the rate of addition is from about 13 to about 17 wt % per minute of polyurethane prepolymer. In still another embodiment the rate of addition is from about 14 to about 17 wt % per minute of polyurethane prepolymer. The amount of diamine equivalents used in the extension reaction is greater than 120% up to about 130% of the equivalents of unreacted isocyanate groups in the prepolymer. In yet another embodiment the extension reaction is carried out with from about 122% to about 130% of diamine based on equivalents of unreacted isocyanate groups in the prepolymer. In another embodiment the extension reaction is carried out with greater than 120% to about 125% of diamine. In another embodiment the extension reaction is carried out with from about 122% to about 125% of diamine based on equivalents of unreacted isocyanate groups in the prepolymer. The ratio of diamine equivalents to unreacted isocyanate groups used in the present invention is selected to provide for a urea content and diamine end groups that facilitate pigment wetting and enhance lamination bonding strengths.

Diamines suitable as monomers in making the poly(urethane/urea) resins include, but are not limited to, ethylene diamine (EDA), 1,3-bis(aminomethyl)cyclohexane (1,3-BAC), 4,4'-diamino-dicyclohexylmethane, 3,3'-dimethyl-4,4'-diamino-dicyclohexylmethane (DMDC) and isophorone diamine (IPDA). In one embodiment of the present invention the diamine is selected from the group consisting of EDA, 1,3-BAC, 4,4'-diamino-dicyclohexylmethane, DMDC, IPDA, and any combination thereof. In another embodiment, the diamine is IPDA. In yet another embodiment the diamine is 1,3-BAC.

In the various embodiments of the present invention, the Poly(urethane/urea) resin has a weight average molecular weight from about 10,000 to about 60,000. In one embodiment the poly(urethane/urea) resin has a weight average molecular weight from about 10,000 to about 50,000. In another embodiment, the poly(urethane/urea) resin has a weight average molecular weight from about 15,000 to about 40,000. In yet another embodiment, the poly(urethane/urea) resin has a weight average molecular weight from about 20,000 to about 30,000. In addition, in the various embodiments of the present invention, the poly(urethane/urea) resin has an amine number from about 3 to about 8 mg KOH/g. In one embodiment of the flexographic ink of the invention the poly(urethane/urea) resin has an amine value from about 3 to about 7 mg KOH/g. In another embodiment of the flexographic ink of the invention the poly(urethane/urea) resin has an amine value of from about 4 to about 7 mg KOH/g. In yet another embodiment of the flexographic ink of the invention the poly(urethane/urea) resin has an amine value of from about 4 to about 6 KOH/g. In still another embodiment the flexographic ink of the invention the poly(urethane/urea) resin has an amine value of about 5 to about 6 KOH/g. Preferably the Poly(urethane/urea) resin is tin free.

A pigment dispersion may be prepared by milling a pigment in a dispersion medium. Any pigment or combination of pigments maybe used as long as the desired retort bond strength is not reduced. Suitable pigments encompass a wide variety of pigments including, but not limited to, organic pigments such as quinacridones, diketopyrrolopyrrols, dipyrrolopyrroles, phthalocyanines, perylenes, azo pigments, and indanthrones, dioxazines such as carbazole violet, isoindolinones, isoindolons, thioindigo reds, and benzimidazolones, azo condensations, metal complex pigments, and inorganic pigments such as carbon blacks, metal oxides such as titanium dioxide, iron oxides of various colors, and zinc oxide.

Examples of pigments that can be used in the present invention include Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 110, Pigment Yellow 114, Pigment Yellow 121, Pigment Yellow 126, Pigment Yellow 127, Pigment Yellow 136, Pigment Yellow 151, Pigment Yellow 155, Pigment Yellow 174, Pigment Yellow 176, Pigment Yellow 180, Pigment 185, Pigment Yellow 188, Pigment Orange 13, Pigment Orange 16, Pigment Orange 34, Pigment Orange 64, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 48, Pigment Red 52, Pigment Red 57, Pigment Red 81, Pigment Red 112, Pigment Red 122, Pigment Red 146, Pigment 166, Pigment Red 170, Pigment Red 176, Pigment 184, Pigment Red 185, Pigment Red 202, Pigment Red 208, Pigment Red 210, Pigment Red 220, Pigment Red 238, Pigment Red 242, Pigment Red 254, Pigment 266, Pigment Blue 15, Pigment Blue 15:1, Pigment Blue 15:2, Pigment Blue 15:3, Pigment Blue 15:4, Pigment Green 7, Pigment Green 36, Pigment Violet 19, Pigment Violet 23, Pigment Violet 37, Pigment Black 7, Pigment White 6, Titanium Dioxide, carbon black, and the like. Preferably, a pigment used in the present invention is thermal stable, good migration fastness, and does not bleed under retort conditions.

The dispersion medium comprises a poly(urethane/urea) resin and PVB, dissolved in an organic solvent. In one embodiment the dispersion medium comprises a poly(urethane/urea) resin, PVB, and an organic solvent or solvent mixture for example, ethanol, n-propyl alcohol, isopropyl alcohol, lower aliphatic esters, such as ethyl acetate and n-propyl acetate, propylene glycol ethers such as propylene glycol n-propyl ether or propylene glycol monoethyl ether. In another embodiment the dispersion medium comprises a poly(urethane/urea) resin, PVB and n-propyl alcohol. In yet another embodiment the dispersion medium comprises a poly(urethane/urea) resin, PVB, n-propyl alcohol and propylene glycol monopropyl ether.

In various embodiments, the PVB comprises from about 20 to about 40 mole percent of vinyl alcohol monomer units. In one embodiment, the PVB comprises from about 25 to about 40 mole percent of vinyl alcohol monomer units. In another embodiment, the PVB comprises from about 20 to about 35 mole percent of vinyl alcohol monomer units. In still another embodiment, the PVB comprises from about 25 to about 35 mole percent of vinyl alcohol monomer units.

The PVB may also comprise vinyl acetate monomer units. In one embodiment the PVB comprises from about 0.5 to about 3.5 mole percent of vinyl acetate monomer units. In another embodiment the PVB comprises from about 0.5 to about 3.0 mole percent of vinyl acetate monomer units. In yet another embodiment the PVB comprises from about 0.7 to about 3.0 mole percent of vinyl acetate monomer units.

PVB suitable for use in the present invention is commercially available, e.g., under the trade name Mowital from Kuraray, Houston, Tex.

Dynamic viscosity of the PVB is the viscosity of a 10% solution of PVB in ethanol (containing 5% water) as measured according to DIN53015 (Hoeppler method), at 20° C. The dynamic viscosity may be expressed in millipascal-seconds (mPa·s). In one embodiment the PVB has a dynamic viscosity from about 6 to about 30 mPa·s. In another embodiment the PVB has a dynamic viscosity of from about 9 to about 20 mPa·s. In yet another embodiment the PVB has a dynamic viscosity from about 9 to about 13 mPa·s. In still another embodiment, the PVB has a dynamic viscosity from about 14 to about 20 mPa·s.

The solvent-based flexographic inks may further include one or more conventional additives and modifying agents such as a wax like polyethylene wax, polyethylene oxide wax, polypropylene wax, and fatty amides, silicone; silica, or plasticizers.

A pigment dispersion may be prepared by dissolving the poly(urethane/urea) resin and PVB in an organic solvent, and adding pigment under agitation. This is usually accomplished by mixing the required components in a stainless steel vessel which is equipped with a high-speed electric agitator.

Typical pigment dispersions include from about 5 to about 50 percent by weight, or from about 10 to about 50 percent by weight pigment or from about 15 to about 50 percent by weight pigment; the amount of pigment used is highly dependent on pigment properties such as specific gravity, surface area, and oil absorption, as is well-known in the art.

In the inks of the present invention, PVB is believed to serve as a dispersing aid to improve rheology and increase the amount of pigment in the ink. In the various embodiments of the invention, pigment dispersions are prepared in a dispersion medium comprising poly(urethane/urea) resin and PVB where the weight ratio of the poly(urethane/urea) resin to PVB is from about 4.0 to about 6.5. In one embodiment of the inks of the present invention, the weight ratio of poly(urethane/urea) resin and PVB is from about 4.5 to about 6.5. In another embodiment the weight ratio of poly(urethane/urea) resin and PVB is from about 4.5 to about 6.3.

Non-limiting examples of suitable milling and dispersion equipment include horizontal shot mills, ball mills, bead mills, roller mills, sand mills, and high-speed dispersers. Many different types of materials may be used as grinding media, such as glass, ceramic, zirconium, metal, or plastic. The grinding media can include particles, preferably substantially spherical in shape, e.g., zirconium beads. In the process of mixing, milling, and dispersion, each process is performed with cooling to prevent buildup of heat.

The contents of milling mixture include the mill grind and grinding media. The mill grind includes pigment, PVB, and solvent. The preferred amount and ratio of the ingredients of the mill grind will vary depending upon the specific materials. The disclosed pigment dispersions are typically prepared by a combination of batch and continuous processing in media mills.

The milling time can vary widely and depends upon the pigment, mechanical means, and residence conditions selected, the initial and desired final particle size etc. Fineness of grind can be measured, for example using a NPIRI (25 micrometer) grind gauge. In various embodiments, the pigment dispersion has an average particle size of from about 0.1 to 15 micrometers. In one embodiment, the pigment dispersion has an average particle size of from about 0.1 to about 10 micrometers. In another embodiment, the pigment dispersion has an average particle size of from about 0.1 to about 10 micrometers. In still another embodiment, the pigment dispersion has an average particle size of from about 0.5 to about 10 micrometers. And in yet another embodiment, the pigment dispersion has an average particle size of from about 0.1 to about 5 micrometers.

After milling is completed, the milling media is separated from the milled pigment dispersion using conventional separation techniques, such as by filtration, sieving through a mesh screen, and the like.

After separation, additional components including the ketone resin and solvents are then added to the milled pigment to achieve the desired viscosity. The required components can be mixed, e.g., by mixing the components in a stainless steel vessel which is equipped with a high-speed agitator. The viscosity of an ink can be regulated by appropriately selecting the type of various components used in the ink formulation. Preferably, the viscosity of an the ink composition prepared according to the method described above has a Brookfield viscosity from about 10 mPa·s to about 1000 mPa·s, or a #3 Zahn Cup viscosity from about 12 seconds to about 35 seconds.

Method of Printing a Laminating Ink

In one embodiment of the invention, the flexographic inks are printed onto a surface of a polymeric substrate and forms a dried ink image that is tack-free and firmly adherent to the surface of the substrate.

Any polymeric substrate may be printed with this method, including sheets of polyethylene, polypropylene, cellulose acetate, cellulose acetate butyrate, polycarbonate, polyamide, PVDC-coated polypropylene, metallized polyethylene terephthalate, metallized polypropylene, coated or uncoated nylon, or polyethylene terephthalate (PET). PET can be, for example, corona treated PET, chemical treated PET, acrylic coated PET, aluminum oxide coated PET, silicone oxide coated PET, or PVDC-coated PET. Film substrates commonly used for lamination are oriented polypropylene and treated polyester films.

A second substrate may be applied or laminated to the dried ink image on the first substrate by any conventional method to form a two-ply structure package. Thus, the second substrate may be applied as an extruded melt onto the dried image to form the second substrate; or a preformed second substrate may be laminated to the dried ink image with an adhesive. The second substrate may be composed of the same material as the first substrate or it may be different depending on the nature of the end use of the printed laminate. The second substrate may be a polyethylene or a cast polypropylene to provide a sealant layer for the package. In many instances the second substrate is the same as the polymeric substrate.

To provide better barrier properties or a longer shelf life of the content in the package, a three-ply structure package can be constructed. A second substrate can be aluminum foil, which is used as the functional barrier and is laminated to the dried ink image with an adhesive. A third substrate may be a polyethylene or a cast polypropylene layer to provide a sealant layer for the package.

The printed laminate can be used, at least in part, as a packaging material for contents (e.g., such as foods, medicinals and the like) which are processed in the packaging material at elevated temperatures by retorting (e.g., pasteurization or sterilization). When the package is subjected to retort conditions, the ink image remains substantially unchanged and the retorted laminate is free of delamination defects. As used herein the term "retort" is intended to include operations and conditions in which packaged contents are subjected to prescribed conditions such as a combination of heat and high pressure, boiling in water; heating in an autoclave, or an oven, or a microwave and with infrared radiation; or the like to sterilize or pasteurize the contents.

Without wishing to be bound by theory, it is believed that the hydroxyl groups of the PVB and the terminal amine groups of the poly(urethane/urea), in the ratios of poly (urethane/urea) to PVB disclosed in the present invention, provide for the surprisingly high color density and bond strength of the flexographic inks of the present invention.

One embodiment of the invention is a solvent-based flexographic ink comprising a solvent-soluble poly(urethane/urea) resin produced by reacting an isocyanate-functional polyurethane prepolymer with a diamine, in which the polyurethane prepolymer is the reaction product of: a diisocyanate component and a diol component comprising a short chain diol having a molecular weight up to about 400 and a polyether diol having a molecular weight from about 500 to about 3,000; polyvinyl butyral; a pigment; and an organic solvent; in which the amine value of the poly (urethane/urea) resin is from about 3 to about 7 and the weight ratio of poly(urethane/urea) resin to polyvinyl butyral (PVB) is from about 4.0 to about 6.5.

Another embodiment is a solvent-based flexographic ink comprising a solvent-soluble poly(urethane/urea) resin produced by reacting an isocyanate-functional polyurethane prepolymer with a diamine, in which the polyurethane prepolymer is the reaction product of: a diisocyanate component and a diol component comprising a short chain diol having a molecular weight up to about 400 and a polyether diol having a molecular weight from about 500 to about 3,000; polyvinyl butyral; a pigment; and an organic solvent; in which the amine value of the poly(urethane/urea) resin is from about 5 to about 7 and the weight ratio of poly (urethane/urea) resin to polyvinyl butyral (PVB) is from about 4.0 to about 6.5.

Yet another embodiment is a solvent-based flexographic ink, comprising a solvent-soluble poly(urethane/urea) resin produced by reacting an isocyanate-functional polyurethane prepolymer with a diamine, in which the polyurethane prepolymer is the reaction product of: a diisocyanate component and a diol component comprising a short chain diol having a molecular weight up to about 400 and a polyether diol having a molecular weight from about 500 to about 3,000; polyvinyl butyral; a pigment; and an organic solvent; in which the amine value of the poly(urethane/urea) resin is from about 5 to about 6 and the weight ratio of poly (urethane/urea) resin to polyvinyl butyral (PVB) is from about 4.0 to about 6.5.

Still another embodiment is a solvent-based, flexographic ink comprising a solvent-soluble poly(urethane/urea) resin produced by reacting an isocyanate-functional polyurethane prepolymer with a diamine, in which the polyurethane prepolymer is the reaction product of: a diisocyanate component and a diol component comprising a short chain diol having a molecular weight up to about 400 and a polyether diol having a molecular weight from about 500 to about 3,000; polyvinyl butyral; a pigment; and an organic solvent; in which the amine value of the poly(urethane/urea) resin is from about 5 to about 6 and the weight ratio of poly (urethane/urea) resin to polyvinyl butyral (PVB) from about 4.0 to about 6.5; and the diamine is 1,3-bis(aminomethyl) cyclohexane.

Another embodiment is a solvent-based, flexographic ink comprising a solvent-soluble poly(urethane/urea) resin produced by reacting an isocyanate-functional polyurethane prepolymer with a diamine, in which the polyurethane prepolymer is the reaction product of: a diisocyanate component and a diol component comprising a short chain diol having a molecular weight up to about 400 and a polyether diol having a molecular weight from about 500 to about 3,000; polyvinyl butyral; a pigment; and an organic solvent; in which the amine value of the poly(urethane/urea) resin is from about 5 to about 6 and the weight ratio of poly (urethane/urea) resin to polyvinyl butyral (PVB) from about 4.0 to about 6.5; and the diamine is isophorone diamine.

Another embodiment is a solvent-based, flexographic ink comprising a solvent-soluble poly(urethane/urea) resin produced by reacting an isocyanate-functional polyurethane prepolymer with a diamine, in which the polyurethane prepolymer is the reaction product of: a diisocyanate component and a diol component comprising a short chain diol having a molecular weight up to about 400 and a polyether diol having a molecular weight from about 500 to about 3,000; polyvinyl butyral; a pigment; and an organic solvent;

in which the amine value of the poly(urethane/urea) resin is from about 5 to about 6 and the weight ratio of poly (urethane/urea) resin to polyvinyl butyral (PVB) from about 4.0 to about 6.5; the polyether diol is polypropylene glycol; and the diamine is isophorone diamine.

Yet another embodiment is a solvent-based flexographic ink comprising a solvent-soluble poly(urethane/urea) resin produced by reacting an isocyanate-functional polyurethane prepolymer with a diamine, in which the polyurethane prepolymer is the reaction product of: a diisocyanate component and a diol component comprising a short chain diol having a molecular weight up to about 400 and a polyether diol having a molecular weight from about 500 to about 3,000; polyvinyl butyral; a pigment; and an organic solvent; in which the amine value of the poly(urethane/urea) resin is from about 5 to about 6 and the weight ratio of poly (urethane/urea) resin to polyvinyl butyral (PVB) from about 4.0 to about 6.5; the diamine is isophorone diamine; and the diisocyanate is isophorone diisocyanate.

Still another embodiment is a solvent-based flexographic ink comprising a solvent-soluble poly(urethane/urea) resin produced by reacting an isocyanate-functional polyurethane prepolymer with a diamine, in which the polyurethane prepolymer is the reaction product of: a diisocyanate component and a diol component comprising a short chain diol having a molecular weight up to about 400 and a polyether diol having a molecular weight from about 500 to about 3,000; polyvinyl butyral; a pigment; and an organic solvent; in which the amine value of the poly(urethane/urea) resin is from about 5 to about 6 and the weight ratio of poly (urethane/urea) resin to polyvinyl butyral (PVB) from about 4.0 to about 6.5; the diamine is 1,3-bis(aminomethyl)cyclohexane; and the diisocyanate is isophorone diisocyanate.

Another embodiment is a solvent-based flexographic ink comprising a solvent-soluble poly(urethane/urea) resin produced by reacting an isocyanate-functional polyurethane prepolymer with a diamine, in which the polyurethane prepolymer is the reaction product of: a diisocyanate component and a diol component comprising a short chain diol having a molecular weight up to about 400 and a polyether diol having a molecular weight from about 500 to about 3,000; polyvinyl butyral; a pigment; and an organic solvent; in which the amine value of the poly(urethane/urea) resin is from about 5 to about 6; the weight ratio of poly(urethane/ urea) resin to polyvinyl butyral (PVB) is from about 4.0 to about 6.5; the diamine is isophorone diamine; the diisocyanate is isophorone diisocyanate; and the short chain diol has a melting point of at least 25° C.

Another embodiment is a solvent-based flexographic ink comprising a solvent-soluble poly(urethane/urea) resin produced by reacting an isocyanate-functional polyurethane prepolymer with a diamine, in which the polyurethane prepolymer is the reaction product of: a diisocyanate component and a diol component comprising a short chain diol having a molecular weight up to about 400 and a polyether diol having a molecular weight from about 500 to about 3,000; polyvinyl butyral; a pigment; and an organic solvent; in which the amine value of the poly(urethane/urea) resin is from about 5 to about 6; the weight ratio of poly(urethane/ urea) resin to polyvinyl butyral (PVB) is from about 4.0 to about 6.5; the diamine is isophorone diamine; the diisocyanate is isophorone diisocyanate; and the short chain diol is 1,6-hexanediol.

The following examples further illustrate details of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all part and percentages are by weight.

EXAMPLES

Example 1

A dispersion medium was prepared by combining 21.1 wt % of n-propyl alcohol, 17.5 wt % of propylene glycol n-propyl ether (PNP), 35.1 wt % of poly(urethane/urea) resin (PrintPur HM 431 (55 wt % solids) (Flint Group, Caronno Pertusella, Italy) and 26.3 wt % of a PVB solution (15 wt % solids). The PVB solution was prepared by mixing 85 wt % n-propyl alcohol, and 15 wt % PVB (Mowital B16H available from Kuraray, Houston Tex.).

Example 2

A pigment dispersion of Pigment Blue 15:4 (phthalocyanine blue from Flint Group Pigments, Elizabethtown, Ky.) was prepared by adding, under agitation, 24 wt % of the Pigment Blue 15:4 to 76 wt % of the dispersion medium of Example 1 and mixing for about 30 minutes to form a premix. The premix was pumped into a shotmill where it was milled to obtain a fineness of grind of 0-1 on NPIRI (25 micrometer) grind gauge (<5 micrometer particle size.

Example 3

A blue flexographic ink was prepared by combining 10 wt % of ketone resin solution, 5 wt % of normal propyl acetate and 10 wt % of propylene glycol monoethyl ether, with 75 wt % of the pigment dispersion of Example 2, and mixing well. The ketone resin solution was prepared by mixing 16.25 wt % PNP, 16.25 wt % ethyl alcohol, 17.5 wt % n-butyl acetate and 50 wt % of a highly alcohol soluble ketone aldehyde resin (Tego® VariPlus SK, Evonic Industries AG, Essen, Germany).

Example 4

A dispersion medium was prepared by combining 19.4 wt % of n-propyl alcohol, 16.1 wt % of PNP, 40.3 wt % of poly(urethane/urea) resin (PrintPur HM 431 available from Flint Group Elizabethtown, Ky.) and 24.2 wt % of a PVB solution. The PVB solution was prepared by mixing 65 wt % n-propyl alcohol, 15% PVB (Mowital B16H available from Kuraray, Houston Tex.), and 20 wt % n-propyl alcohol.

Example 5

A pigment dispersion of Pigment Black 7 was prepared by adding 29.0 wt % of Pigment Black 7 to 71.0 wt % of the dispersion medium of Example 4, with high speed mixing for about 30 minutes to form a premix. The premix was pumped into a shotmill where it was milled to obtain a fineness of grind of 0-1 on NPIRI (25 micrometers) grind gauge.

Example 6

A black flexographic lamination ink was prepared by combining 10 wt % of ketone resin solution (as described in Example 3), 5 wt % of normal propyl acetate and 5 wt % of propylene glycol monoethyl ether, with 80 wt % of the pigment dispersion of Example 2 and mixing well.

A yellow flexographic lamination ink was prepared essentially as in Example 3 using Pigment Yellow 155 instead of Pigment Blue 15:4, and using as a dispersion medium 18.2 wt % of n-propyl alcohol, 18.2 wt % of PNP, 36.4 wt % of poly(urethane/urea) resin and 27.3 wt % of the PVB solution, and the pigment dispersion being 26.7 wt % of pigment, to 73.3 wt % of the dispersion medium.

Example 7

A magenta flexographic lamination ink was prepared essentially as in Example 3 using Pigment Red 122 instead of Pigment Blue 15:4, the dispersion medium having 25.8 wt % of n-propyl alcohol, 16.1 wt % of PNP, 33.9 wt % of poly(urethane/urea) resin and 24.2 wt % of the PVB solution, and the pigment dispersion being 17.3 wt % of pigment, to 82.7 wt % of the dispersion medium.

Inventive and Comparative Examples

Ink formulations according to the present invention were compared with formulations having a poly(urethane/urea) to PVB ratio higher or lower than the ratios used in the present invention. Ink formulations according to the present invention were also compared with formulations having a poly(urethane/urea) that is not amine terminated (amine value is 0 mg KOH/g). The inks were prepared as generally described in examples 1-7.

For each of the following examples, the tests were run to measure viscosity, color density and lamination bond strengths of the inks. Viscosity of the virgin inks was measured using a Zahn Cup #3. For each of the following examples, they were cut to press viscosity; about 25 seconds measured using a Zahn Cup #2. Drawdown samples were prepared in the lab using a 800 lpi/2.1 bcm handproofer. Colorimetric measurement of prints is measured using X-Rite 900 series or eXact spectrodensitometer, (X-Rite, Grand Rapids, Mich.). Retort testing was carried out under the following conditions: 122 to 138° C. at 2.5 to 3 bar pressure for 40 minutes. Lamination bond strengths (g/in) were determined after three cycles of retort at a print speed of about 2000 feet per minute. Anilox for colored inks was about 1200 lines per inch (lpi) and 1.8 cubic micrometers per square inch (bcm).

In the following testing examples 8-20, inks were printed on five different types of films: corona treated PET film, acrylic coated PET film, aluminum oxide coated PET film, silicone oxide coated PET, and nylon, using a handproofer with 800 lpi/2.1 bcm. A commercially available solvent-based urethane adhesive was applied at 2.25 to 3 lbs./ream to the printed film. A cast polypropylene or an aluminum foil (pre- or post-laminated with cast polypropylene) was then laminated to the printed film and cured for 5 days in a 49° C. oven. The adhesive used was Liofol UR2790/UR5026 and Liofol UR3649/UR6255 (Henkel, AG & Co. KGaA). Test results are shown for the corona treated PET film. The other films showed similar results.

A pouch-shaped package was produced by heat seal processing the laminated films. A mixture of water/ketchup/vinegar at 1:1:1 weight ratio was placed in the pouches. The pouches were sealed and evaluated for retort resistance.

The formulations of the inventive and comparative inks and corresponding data are shown in Tables 1, 2, 3, 4 and 5. Table 1 provides ink formulations (examples 8-12) according to the present invention in which the ratio of poly (urethane/urea) to PVB is from 4.9 to 6.1, the poly(urethane/urea) has an amine value of about 5, the virgin ink viscosity is from 12 to 16 seconds as measured using a Zahn #3 cup, and the lamination bond strength before and after retort is destruct to >500 g/in.

Table 2 provides ink formulations (examples 13-16) where the ratio of poly(urethane/urea) to PVB is from 7.0 to 7.5 the poly(urethane/urea) has an amine value of about 5, and the virgin ink viscosity is from 20 to 30 seconds as measured using a Zahn #3 cup, and the lamination bond strength before to retort is from 200 to 250 g/in.

Table 3 provides ink formulations (examples 16-20) where the ratio of poly(urethane/urea) to PVB is from 2.9 to 3.1, the poly(urethane/urea) has an amine value of about 5, the virgin ink viscosity is from 13 to 18 seconds as measured using a Zahn #3 cup, and the lamination bond strength before retort is from 150 to 200 g/in.

Table 4 provides ink formulations (examples 21-25) where the poly(urethane/urea) has an amine value of zero, the virgin ink viscosity is from 25 to 30 seconds as measured using a Zahn #3 cup, and the lamination bond strength before retort is from 350 to 400 g/in, and after retort is from 150 to 200 g/in.

Table 5 provides ink formulations (examples 26-30) where the poly(urethane/urea) has an amine value of zero, the virgin ink viscosity is from 20 to 33 seconds as measured using a Zahn #3 cup, and the lamination bond strength before retort is from 250 to 400 g/in, and after retort is from 100 to 200 g/in.

Inventive Examples 8-12

TABLE 1

| Example number | 8 | 9 | 10 | 11 | 12 |
|---|---|---|---|---|---|
| Description | White | Cyan | Black | Yellow | Magenta |
| Normal propyl alcohol | 10.00% | 12.00% | 12.00% | 10.00% | 16.00% |
| Santicizer 141 (Phosphate Plasticizer) [1] | 1.00% | | | | |
| Propylene glycol monopropyl ether (PNP) | | 10.00% | 10.00% | 10.00% | 10.00% |
| PRINTPUR HM 431 [2] poly(urethane/urea) | 15.00% | 20.00% | 25.00% | 20.00% | 21.00% |
| B16H solution (PVB) [3] | 10.00% | 15.00% | 15.00% | 15.00% | 15.00% |
| Pigment White 6 | 45.00% | | | | |
| Pigment Blue 15:4 | | 18.00% | | | |
| Pigment Black 7 | | | 18.00% | | |
| Pigment Yellow 155 | | | | 20.00% | |
| Pigment Red 122 | | | | | 13.00% |
| SK ketone solution [4] | 6.00% | 10.00% | 10.00% | 10.00% | 10.00% |
| Normal propyl acetate | | 5.00% | 5.00% | 5.00% | 5.00% |
| Dipropylene glycol monomethyl ether | 2.00% | | | | |
| Propylene glycol monomethyl ether | 4.00% | 10.00% | 5.00% | 10.00% | 10.00% |
| CSME-100 [5] (Soy Methyl Esters) | 2.00% | | | | |
| Glycol ether PM acetate | 5.00% | | | | |
| Viscosity (Zahn #3, seconds) | 12 | 13 | 11 | 13 | 16 |
| Color Density (800 lpi/2.1 bcm handproofer) | | 1.75 | 1.80 | 1.1 | 1.4 |

TABLE 1-continued

| Example number | 8 | 9 | 10 | 11 | 12 |
|---|---|---|---|---|---|
| Lamination bond strength before retort (g/in) | >500 Destruct | >500, Destruct | >500, Destruct | >500, Destruct | >500, Destruct |
| Lamination bond strength after retort (g/in) | Destruct | Destruct | Destruct | Destruct | Destruct |
| Ratio of poly(urethane/urea) to PVB | 5.5 | 4.9 | 6.1 | 4.9 | 5.1 |

[1] Ferro Corporation, Polymer Specialty Materials, Independence, OH
[2] Flint Group, Caronno Pertusella, Italy
[3] The PVB solution was prepared by mixing 85 wt % n-propyl alcohol, 15% PVB (Mowital B16H, Kuraray, Houston, TX).
[4] The ketone resin solution was prepared by mixing 16.25 wt % propylene glycol n-propyl ether, 16.25 wt % ethyl alcohol, 17.5 wt % n-butyl acetate and 50 wt % (Tego ® VariPlus SK, Evonic Industries AG, Essen, Germany).
[5] Chimista Specialty Chemicals, LLC, Jasper, Georgia

Comparative Examples

TABLE 2

| Example number | 13 | 14 | 15 | 16 |
|---|---|---|---|---|
| Description | Cyan | Black | Yellow | Magenta |
| Normal propyl alcohol | 12.00% | 12.00% | 10.00% | 16.00% |
| Propylene glycol monopropyl ether (PNP) | 10.00% | 10.00% | 10.00% | 10.00% |
| PRINTPUR HM 431 poly(urethane/urea) | 23.00% | 26.50% | 23.00% | 24.00% |
| B16H solution (PVB) | 12.00% | 13.50% | 12.00% | 12.00% |
| Pigment Blue 15:4 | 18.00% | | | |
| Pigment Black 7 | | 18.00% | | |
| Pigment Yellow 155 | | | 20.00% | |
| Pigment Red 122 | | | | 13.00% |
| SK ketone solution | 10.00% | 10.00% | 10.00% | 10.00% |
| Normal propyl acetate | 5.00% | 5.00% | 5.00% | 5.00% |
| Propylene glycol monoethyl ether | 10.00% | 5.00% | 10.00% | 10.00% |
| Viscosity (Zahn #3, seconds) | 25 | 20 | 25 | 30 |
| Color Density (800 lpi/2.1 bcm handproofer) | 1.35 | 1.4 | 0.8 | 1.1 |

TABLE 2-continued

| Example number | 13 | 14 | 15 | 16 |
|---|---|---|---|---|
| Lamination bond strength before retort (g/in) | 250 | 200 | 250 | 200 |
| Lamination bond strength after retort (g/in) | 100 | 80 | 110 | 100 |
| Ratio of poly(urethane/urea) to PVB | 7.0 | 7.2 | 7.0 | 7.3 |

TABLE 3

| Example number | 17 | 18 | 19 | 20 |
|---|---|---|---|---|
| Description | Cyan | Black | Yellow | Magenta |
| Normal propyl alcohol | 2.00% | 7.00% | 0.00% | 6.00% |
| Propylene glycol monopropyl ether (PNP) | 10.00% | 10.00% | 10.00% | 10.00% |
| PRINTPUR HM 431 poly(urethane/urea) | 20.00% | 20.00% | 20.00% | 21.00% |
| B16H solution (PVB) | 25.00% | 25.00% | 25.00% | 25.00% |
| Pigment Blue 15:4 | 18.00% | | | |
| Pigment Black 7 | | 18.00% | | |
| Pigment Yellow 155 | | | 20.00% | |
| Pigment Red 122 | | | | 13.00% |
| SK ketone solution | 10.00% | 10.00% | 10.00% | 10.00% |
| Normal propyl acetate | 5.00% | 5.00% | 5.00% | 5.00% |
| Propylene glycol monoethyl ether | 10.00% | 5.00% | 10.00% | 10.00% |
| Viscosity (Zahn #3, seconds) | 15 | 13 | 15 | 18 |
| Color Density (800 lpi/2.1 bcm handproofer) | 1.4 | 1.4 | 0.9 | 1.2 |
| Lamination bond strength before retort (g/in) | 150 | 200 | 200 | 200 |
| Lamination bond strength after retort (g/in) | 50 | 80 | 80 | 50 |
| Ratio of poly(urethane/urea) to PVB | 2.9 | 2.9 | 2.9 | 3.1 |

TABLE 4

| Example number | 21 | 22 | 23 | 24 | 25 |
|---|---|---|---|---|---|
| Description | White | Cyan | Black | Yellow | Magenta |
| NeoRez U 395[6] | 23.00% | 25.50% | 25.50% | 25.00% | 25.50% |
| B 16H solution (PVB) | 16.00% | 15.00% | 15.00% | 15.00% | 15.00% |
| SK ketone solution | 10.00% | 10.00% | 10.00% | 10.00% | 10.00% |
| Normal Propyl Alcohol | 6.00% | 6.50% | 11.50% | 5.00% | 11.00% |
| Propylene glycol monoethyl ether | | 10.00% | 10.00% | 10.00% | 10.00% |
| Propylene glycol monoethyl ether | | 10.00% | 5.00% | 10.00% | 10.00% |
| Normal Propyl Acetate | 5.00% | 5.00% | 5.00% | 5.00% | 5.00% |
| Pigment White 6 | 40.00% | | | | |
| Pigment Blue 15:4 | | 18.00% | | | |
| Pigment Black 7 | | | 18.00% | | |
| Pigment Yellow 155 | | | | 20.00% | |
| Pigment Red 122 | | | | | 13.00% |
| Viscosity (Zahn #3, seconds) | 25 | 25 | 25 | 30 | 30 |

TABLE 4-continued

| Example number | 21 | 22 | 23 | 24 | 25 |
|---|---|---|---|---|---|
| Color Density (800 lpi/2.1 bcm handproofer) | | 1.4 | 1.4 | 0.8 | 1.1 |
| Lamination bond strength before retort (g/in) | 400 | 350 | 300 | 330 | 350 |
| Lamination bond strength after retort (g/in) | 200 | 150 | 180 | 150 | 200 |
| Ratio of poly(urethane/urea) to PVB | 4.3 | 5.1 | 5.1 | 5.0 | 5.1 |

TABLE 5

| Example number | 26 | 27 | 28 | 29 | 30 |
|---|---|---|---|---|---|
| Description | White | Cyan | Black | Yellow | Magenta |
| NeoRez U 395[6] | 15.00% | 10.50% | 10.50% | 10.00% | 10.50% |
| NeoRez U 397[7] | | 10.00% | 10.00% | 10.00% | 10.00% |
| B 16H solution (PVB) | 30.00% | 25.00% | 25.00% | 25.00% | 25.00% |
| SK ketone solution | 6.00% | 10.00% | 10.00% | 10.00% | 10.00% |
| Normal Propyl Alcohol | 4.00% | 1.50% | 6.50% | 0.00% | 6.00% |
| Propylene glycol monoethyl ether | | 10.00% | 10.00% | 10.00% | 10.00% |
| Propylene glycol monoethyl ether | | 10.00% | 5.00% | 10.00% | 10.00% |
| Normal Propyl Acetate | 5.00% | 5.00% | 5.00% | 5.00% | 5.00% |
| Pigment White 6 | 40.00% | | | | |
| Pigment Blue 15:4 | | 18.00% | | | |
| Pigment Black 7 | | | 18.00% | | |
| Pigment Yellow 155 | | | | 20.00% | |
| Pigment Red 122 | | | | | 13.00% |
| Viscosity (Zahn #3, seconds) | 20 | 28 | 28 | 30 | 33 |
| Color Density (800 lpi/2.1 bcm handproofer) | | 1.35 | 1.3 | 0.7 | 1.0 |
| Lamination bond strength before retort (g/in) | 400 | 300 | 250 | 330 | 350 |
| Lamination bond strength after retort (g/in) | 200 | 150 | 100 | 120 | 150 |
| Ratio of poly(urethane/urea) to PVB | 1.5 | 2.5 | 2.5 | 2.4 | 2.5 |

[6]DSM NeoResin, Wilmington, MA
[7]DSM NeoResin, Wilmington, MA

The results in Table 1 clearly show that the color density achieved for the inks of the invention and the bond strength, both before and after retort, are significantly better than the comparative ink (Tables 2-5). The poly(urethane/urea) used in the inks set forth in Tables 1-3 are the same and have an amine value of about 5, however, the ratio of poly(urethane/urea) to PVB differs between Tables 1-3. The inks of the invention shown in Table 1, have a ratio of poly(urethane/urea) to PVB from 4.9 to 6.1. The comparative inks shown in Table 2 have a higher ratio of poly(urethane/urea) to PVB with ratios from 7.0-7.3. The comparative inks shown in Table 3 have a lower ratio of poly(urethane/urea) to PVB with ratios from 2.9 to 3.1. Tables 4 and 5 both describe comparative ink formulations containing a poly(urethane/urea) with an amine value of zero, however the ratio of poly(urethane/urea) to PVB differs between the inks of Table 4 and 5. The inks described in Table 4 have a poly(urethane/urea) to PVB ratio from 4.4 to 5.1 (similar to the inventive inks) and the inks described in Table 5 have a poly(urethane/urea) to PVB ratio from 1.5 to 2.5. The comparative inks show high virgin ink viscosity and/or poor rheology; therefore, in turn the color density achieved of these inks at press viscosity are lower when compared to the inks listed in Table 1.

For Examples 31 and 32 the testing conditions are as follows. The first cycle was carried out at 250° F./30 psi for 60 minutes and the second cycle was at carried out at 265° F./35 psi for 30 minutes.

Example 31

A flexographic ink formulations of examples 8 to 12 were printed on two types of PET films, corona treated PET (F-AUU) and aluminum oxide coated PET (GL-ARH) using a narrow web flexographic press (OMET, Varyflex V2 530).

The anilox for color(s) was 1200 lpi/1.8 bcm; the anilox for white was 200 lpi/8.0 and the press speed was 200-300 fpm. The bond strength was determined to be higher than 500 g/in to destruct for all of the prints.

Example 32

A flexographic ink formulation of examples 8 to 12 were printed on a corona treated PET film using a wide web flexographic press (UTECO Group, ONYX central impression flexographic printing press). The anilox for color(s) was 960 lpi/2.0 bcm; the anilox for white was 360 lpi/4.8 bcm and the press speed was 1200-1600 fpm. The bond strength was determined to be destruct for all of the prints.

What is claimed is:
1. A solvent-based, flexographic ink, comprising:
   (A) a solvent-soluble poly(urethane/urea) resin produced by reacting an isocyanate-functional polyurethane prepolymer with a diamine, wherein the polyurethane prepolymer is the reaction product of:
      (a) a diisocyanate component; and
      (b) a diol component comprising a short chain diol and a polyether diol
   wherein the short chain diol has a molecular weight up to about 400 and the polyether diol has a number average molecular weight from about 500 to about 3,000;
   (B) polyvinyl butyral;
   (C) a pigment; and
   (D) an organic solvent
wherein the amine value of the poly(urethane/urea) resin is from about 3 to about 7, and the weight ratio of poly(urethane/urea) resin to polyvinyl butyral is from about 4.0 to about 6.5.

2. The flexographic ink according to claim 1, wherein the molar ratio of isocyanate groups in the diisocyanate component (a) to OH groups in the diol component (b) is from about 1.2 to about 1.8.

3. The flexographic ink according to claim 1, wherein the reaction product of (a) and (b) has from about 1.3 to about 5.0 wt % of unreacted isocyanate groups.

4. The flexographic ink according to claim 1, wherein the molar ratio of short chain diol to polyether diol is from about 0.67 to about 1.5.

5. The flexographic ink according to claim 1, wherein the short chain diol has a melting point at least 25° C.

6. The flexographic ink according to claim 1, wherein the short chain diol is selected from the group consisting of neopentyl glycol, 1,6-hexanediol, 1,8 octanediol, 1,9-nonanediol, 1,10-decanediol, 1,12-octadecanediol, and any combination thereof.

7. The flexographic ink according to claim 1, wherein the polyether diol is polypropylene glycol.

8. The flexographic ink according to claim 1, wherein the diisocyanate component comprises a diisocyanate selected from the group consisting of isophorone diisocyanate, 4,4'-diphenylmethane diisocyanate, toluene diisocyanate, hexamethylene diisocyanate, 1,3-bis(1-isocyanato-1-methylethyl)benzene, and any combination thereof.

9. The flexographic ink according to claim 8, wherein the diisocyanate is isophorone diisocyanate.

10. The flexographic ink according to claim 1, wherein the equivalents of diamine added is greater than 120% and up to about 130% of the equivalents of unreacted isocyanate groups in the prepolymer.

11. The flexographic ink according to claim 10, wherein the diamine is added to the polyurethane prepolymer at a rate of from about 12 to about 20 wt % per minute of the polyurethane prepolymer.

12. The flexographic ink according to claim 1, wherein the diamine is selected from the group consisting of 1,3-bis(aminomethyl)cyclohexane, 4,4'-diamino-dicyclohexylmethane, 3,3'-dimethyl-4,4'-diamino-dicyclohexylmethane, ethylene diamine, isophorone diamine, and any combination thereof.

13. The flexographic ink according to claim 1, wherein the polyvinyl butyral comprises from about 20 to about 40 mole percent of vinyl alcohol monomer units.

14. The flexographic ink according to claim 1, wherein the amine value of the poly(urethane/urea) resin is from about 5 to about 6.

* * * * *